US007017890B2

(12) United States Patent
Rechtien

(10) Patent No.: US 7,017,890 B2
(45) Date of Patent: Mar. 28, 2006

(54) RUBBER BEARING WITH ANTI-VIBRATION SYSTEM

(75) Inventor: Martin Rechtien, Neuenkirchen-Vörden (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 0 days.

(21) Appl. No.: 10/433,867

(22) PCT Filed: Oct. 10, 2002

(86) PCT No.: PCT/DE02/03811

§ 371 (c)(1),
(2), (4) Date: Jun. 4, 2003

(87) PCT Pub. No.: WO03/033934

PCT Pub. Date: Apr. 24, 2003

(65) Prior Publication Data

US 2004/0046295 A1 Mar. 11, 2004

(30) Foreign Application Priority Data

Oct. 12, 2001 (DE) ................................ 101 50 189

(51) Int. Cl.
*F16F 1/38* (2006.01)
*F16C 1/08* (2006.01)

(52) U.S. Cl. ................................ 267/141.3; 267/141.5

(58) Field of Classification Search .. 267/141.1–141.7, 267/293; 384/146, 203, 222; 403/225, 226, 403/227, 228, 135

See application file for complete search history.

(56) References Cited

U.S. PATENT DOCUMENTS

| | | | | |
|---|---|---|---|---|
| 5,013,166 | A | 5/1991 | Domer | |
| 5,058,867 | A | 10/1991 | Hadano et al. | |
| 5,364,191 | A | 11/1994 | Gruber | |
| 5,902,050 | A | 5/1999 | Balczun et al. | |
| 6,113,302 | A * | 9/2000 | Buhl | 403/133 |
| 6,224,046 | B1 * | 5/2001 | Miyamoto | 267/281 |
| 6,273,406 | B1 | 8/2001 | Miyamoto et al. | |
| 6,341,915 | B1 * | 1/2002 | Kammel | 403/135 |

FOREIGN PATENT DOCUMENTS

| | | |
|---|---|---|
| DE | 36 13 808 | 10/1987 |
| DE | 39 33 163 | 7/1992 |
| DE | 690 00 203 | 12/1992 |
| DE | 198 18 161 | 11/1999 |
| DE | 100 11 124 | 9/2001 |
| EP | 0 553 565 | 8/1993 |

* cited by examiner

*Primary Examiner*—Christopher P. Schwartz
(74) *Attorney, Agent, or Firm*—McGlew & Tuttle PC

(57) ABSTRACT

A vibration-damped rubber mount is provided to ensure good sliding friction properties over a broad spectrum of spring rigidities with a simple design in a vibration-damped rubber mount with an inner part, which is surrounded by an outer sleeve, where an elastomer ring body is provided between the inner part and the outer sleeve for vibration damping, it is proposed that the elastomer ring body (4) is arranged radially on the outside at the inner wall of the outer sleeve (3) and radially on the inside at a sleeve-like bearing shell (5), which slidingly cooperates with the inner part (1), forming a ball-and-socket joint.

2 Claims, 1 Drawing Sheet

RUBBER BEARING WITH ANTI-VIBRATION SYSTEM

FIELD OF THE INVENTION

The present invention pertains to a vibration-damped rubber mount with an inner part, which is surrounded by an outer sleeve, wherein an elastomer ring body is provided for vibration damping between the inner part and the outer sleeve.

BACKGROUND OF THE INVENTION

The manufacture of vehicles, where this component is used, e.g., to fasten a vibration damper to a carrier part of a vehicle, is a preferred field of use of such rubber mounts. The carrier part may be designed as a wheel carrier or as a rear axle transverse swinging arm. However, the use of the rubber mount according to the present invention is not limited to the area of vehicle manufacture. Thus, the vibration-damped rubber mount may also be used, e.g., in the manufacture of machine tools, transportation equipment or other technical areas.

Manufacturing a vibration-damped rubber mount from a cylindrical outer sleeve made of steel, into which a likewise cylindrically shaped elastomer ring body is inserted, into which a likewise cylindrical inner part made of steel is in turn inserted, belongs to the general state of the art. This rubber mount receives its vibration-damping property from the elastomer ring body, which consists mostly of ordinary rubber. The vibration-damped rubber mount is arranged between a first carrier part via the outer sleeve of this carrier part, which said outer sleeve may also be made in one piece with the first carrier part, and a second carrier part, which is fastened to the inner part. As a result, a vibration-damped mounting of the first carrier part in relation to the second carrier part is achieved.

Even though this rubber mount can be manufactured and mounted in a simple manner due to the nested design of its individual parts, special measures are nevertheless necessary to prevent a relative axial movement of the carrier parts to prevent the rubber mount from falling apart.

It is also generally known that the individual components can be firmly connected to one another. This connection is brought about by vulcanizing the elastomer ring body to the outer sleeve as well as to the inner part. However, a rubber mount of such a design has the drawback that opposite areas that are subject to extreme tensile and compressive loads will develop in the elastomer ring body due to an angular offset of the first carrier part in relation to the second carrier part. Cracking will develop in the elastomer ring body in the extreme case especially in the areas subject to tensile load, because the material of the elastomer ring body is not suitable for a tensile load. The same drawback also occurs in the case of an extreme axial load on such a rubber mount of a one-piece design.

DE 100 11 124 A1 shows a rubber mount in which the drawbacks described above are avoided by the inner part being provided with an spherical part formed integrally in one piece radially on the outside to form a ball-and-socket joint. This part formed integrally in one piece cooperates with an outer sleeve of a corresponding design. An elastomer ring body with permanent wall thickness, which body comes slidingly into contact with the integral spherical one-piece part of the inner part, is arranged between the outer sleeve and the inner part. It is possible due to such a design to considerably increase the service life of the vibration-damped rubber mount compared with rubber mounts in which the elastomer ring body is arranged adhesively between the inner part and the outer sleeve. In conjunction with the sliding contact of the inner part of the elastomer ring body, the elastomer ring body is loaded exclusively for compression due to the ball-and-socket-like design. This is true in case of both axial load and radial load on the rubber mount and in case of an angular offset between the inner part and the outer sleeve, i.e., in case of cardanic load. One drawback of this vibration-damped rubber mount is, however, the fact that the increase in the rigidity of the spring in the direction of the load is limited by the structural design of the vibration-damped rubber mount. The rigidity of the spring can be achieved by the use of a harder rubber material, by reducing the wall thickness of the elastomer ring body or by widening the rubber mount. However, the sliding friction to be overcome between the inner part and the elastomer ring body also increases herewith at the same time.

SUMMARY OF THE INVENTION

The object of the present invention is therefore to improve a vibration-damped rubber mount of the type described above to the extent that optimal sliding friction properties can be obtained between the components that can move in relation to one another in a broad spectrum of spring rigidities with a simple design.

According to the invention, a vibration-damped rubber mount is provided with an inner part, an outer sleeve surrounding the inner part and a bearing shell cooperating with the inner part to form a ball-and-socket joint. The present invention includes the technical teaching that an elastomer ring body is arranged radially on the outside at the inner wall of the outer sleeve and radially on the inside at a sleeve-like bearing shell, which slidingly cooperates with the inner part, forming a ball-and-socket joint.

The advantage of the solution according to the present invention is especially that the good sliding friction properties present between the sleeve-like bearing shell and the inner part are independent from the selection of the spring rigidity of the elastomer ring body. Thus, the selection of a harder rubber for the elastomer ring body for the purpose of setting a higher spring rigidity does not cause an associated increase in the sliding friction on the ball-and-socket joint. This property is achieved by the local separation from the area of the ball-and-socket joint to the area of the vibration damper via the sleeve-like bearing shell. The vibration-damped rubber mount according to the present invention is characterized by its very low breakaway torque and momentum of body. This is embodied for small movement amplitudes by the molecular movement in the rubber material of the elastomer ring body, which is hardly affected by external forces. The cooperation of the inner part with the outer part via the intermediary of the ball-and-socket joint leads to an effective security against the axial excursion of the rubber mount.

The elastomer ring body is preferably vulcanized, bonded or connected in substance in another way to the adjacent components, namely, the outer sleeve, on the one hand, and the bearing shell, on the other hand. This one-piece component can be manufactured as a rubber-metal part in a simple manner. The outer sleeve or the bearing shell as well as the inner part preferably consist of a plastic, a light metal or steel. Because of its relatively complicated shape and to achieve good sliding friction properties, especially the sleeve-like bearing shell may be made of plastic according to the injection molding process.

A first carrier part, e.g., of a vehicle, may be fastened via the outer sleeve of the vibration-damped rubber mount by pressing, bonding, screwing or clamping or fastening in a similar manner in a corresponding recess of the first carrier part. Besides, it is also possible to make the outer sleeve of the rubber mount according to the present invention as part of the first carrier part in one piece with the first carrier part. This variant is especially suitable if the first carrier part is a hydraulic vibration absorber or the like.

The inner part of the rubber mount is preferably tubular and is provided with an outer radial integral spherical one-piece part of the of the ball-and-socket joint, which cooperates with the correspondingly shaped bearing shell in order to receive a screw for fastening to a second carrier part, e.g., a control arm of a chassis.

According to another measure that improves the present invention, a sealing ring each is provided in the bilateral transition area between the integral spherical one-piece part of the inner part and the adjacent tube sections to seal the rubber mount area enclosed hereby. This simple measure prevents dirt and dust from penetrating into the rubber mount area. The two sealing rings may be fixed in associated circumferential grooves on the inner part or on the bearing shell. A bellows each, which is arranged between the inner part, on the one hand, and the bearing shell, on the other hand, may be provided at the front sides of the rubber mount as an additional sealing measure. The bellows may also be arranged between the inner part, on the one hand, and the outer sleeve, on the other hand, so that it also covers the area of the elastomer ring body.

According to another measure that improves the assembly of the rubber mount according to the present invention, the bearing shell corresponding to the inner part has an axially divided design, so that an inner sleeve base part can be fitted together with an inner sleeve cover part. The fitting together should be performed detachably by means of a screw or snap connection to make possible disassembly. However, it is also conceivable that the inner sleeve base part is detachably connected to the inner sleeve cover part, preferably by means of a bonded or welded connection, after the assembly of the inner part.

Other measures that improve the present invention will be described in greater detail below together with the description of a preferred exemplary embodiment of the present invention on the basis of the figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

Figure 1:
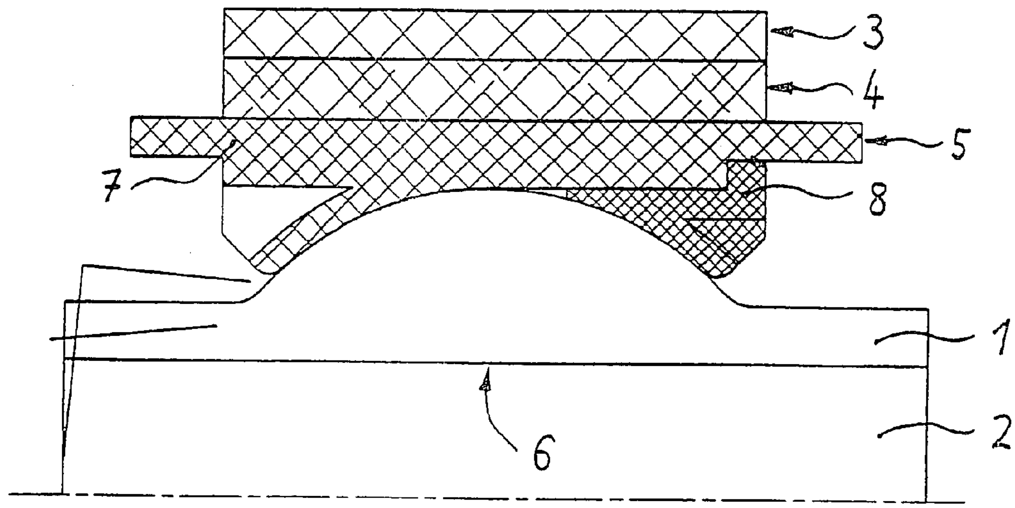
FIG. 1 is a schematic partial longitudinal sectional view of a vibration-damped rubber mount according to the present invention.
Figure 2:
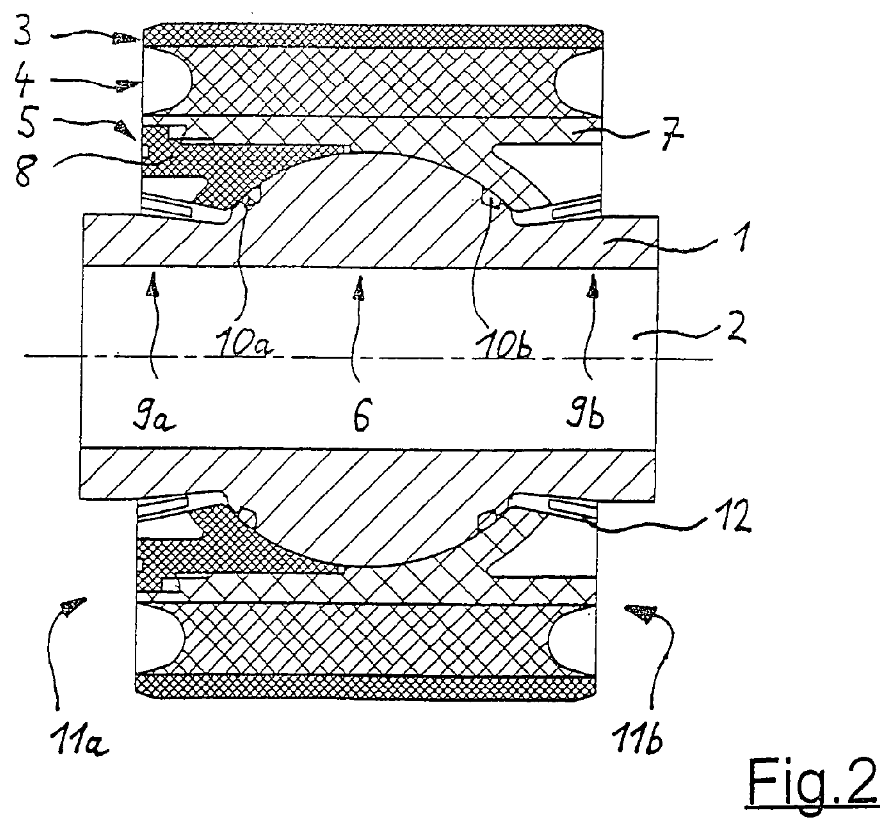
FIG. 2 is a detailed longitudinal sectional view of a vibration-damped rubber mount according to the present invention.

Referring to the drawings in particular, the rubber mount according to FIG. 1 has an inner part 1, which is fastened to a first carrier part, not shown here, via a coaxial through hole 2 by means of a screw connection. An outer sleeve 3 consisting of a rigid material cooperates with a second carrier, which is likewise not shown here. The inner part 1 is made of steel, whereas the outer sleeve 3 consists of a plastic. An elastomer ring body 4 is arranged between the inner part 1 and the outer sleeve 3 for vibration damping. The elastomer ring body 4 is made directly in one piece with the inner wall of the outer sleeve 3 radially on the outside and it is made in one piece with a sleeve-like bearing shell 5 radially on the inside. Thus, the outer sleeve 3 forms a one-piece component together with the elastomer ring element 4 and the inner bearing shell 5. The sleeve-like bearing shell 5 has radially on the inside a recess, which comes slidingly into contact with a corresponding outer radial integral spherical part 6 on the inner part 1 to form a ball-and-socket joint. For mounting on the inner part 1, the corresponding bearing shell 5 has an axially divided design and comprises an inner sleeve base part 7 (with an inner part bearing surface), which is fitted together with an inner sleeve cover part 8 (with an inner part bearing surface) by ultrasonic welding. As is apparent in greater detail from FIG. 2, a sealing ring 10*a*, 10*b* each, which is arranged in respective corresponding circumferential grooves on the inner part 1, is provided in the bilateral transition area between the integral spherical one-piece part 6 of the inner part 1 and the adjacent tube sections 9*a*, 9*b* to seal the rubber mount area. As an additional sealing measure, both front sides 11*a*, 11*b* of the rubber mount may be provided with a bellows, not shown here, which are fastened between the inner part 1, on the one hand, and the bearing shell 5, on the other hand.

A ribbed collar edge 12 forms an elastic stop limitation between the inner part 1 and the bearing shell 5. The vibration-damped rubber mount according to the present invention exerts its vibration-damping properties especially under a radial load as a consequence of a compressive load acting here on the elastomer ring body 4. Excursion of the inner part 1 from the outer sleeve 3 is avoided under an axial load because of the ball-and-socket joint. The ball-and-socket joint makes possible an angular offset of the inner part 1 in relation to the outer sleeve 3 within the limits that are defined by end sections of the bearing shell 5. Because of the ball-and-socket joint, the rubber mount according to the present invention makes possible an unhindered rotary movement of the inner part relative to the outer sleeve. The vibration-damped rubber mount provided with the degrees of freedom explained above can ensure a broad spectrum of spring rigidities at equally good sliding friction properties between the components movable in relation to one another thanks to the corresponding selection of the material for the elastomer ring body.

While a specific embodiment of the invention has been shown and described in detail to illustrate the application of the principles of the invention, it will be understood that the invention may be embodied otherwise without departing from such principles.

The invention claimed is:

1. A vibration-damped rubber mount comprising:

an inner part with a first tubular section, a second tubular section and an intermediate spherical section extending radially outwardly with respect to said first tubular section and said second tubular section and defining a spherical bearing surface;

an outer sleeve surrounding said inner part;

a bearing shell cooperating with said inner part to form a ball-and-socket joint, said bearing shell comprising an annular base part with an inner part bearing surface and an annular cover part with another inner part bearing surface, said cover part being connected to said base part with said inner part bearing surface and said another inner part bearing surface each being in contact with a portion of said spherical bearing surface, said cover part having a smaller outer diameter than an outer diameter of said base part with said cover part arranged within said base part and said base part being adjacent to said first tubular section and with said inner part bearing surface in contact with one side of said spherical section and said cover part being adjacent to said second tubular section and with said another inner part bearing surface in contact with another side of said spherical section;

an elastomer ring body provided directly in contact with an inner wall of said outer sleeve and directly in contact with an outer surface of said base part for vibration damping between said inner wall of said outer sleeve and said bearing shell.

2. A vibration-dumped rubber mount in accordance with claim 1, wherein said elastomer ring body is a single piece and is vulcanized or bonded to said outer sleeve and is vulcanized or bonded to said bearing shell to form a one-piece component.

* * * * *